(12) United States Patent
Fu et al.

(10) Patent No.: US 9,011,731 B2
(45) Date of Patent: Apr. 21, 2015

(54) METHOD FOR PREPARING NEGATIVE ELECTRODE MATERIAL OF LITHIUM ION BATTERY

(71) Applicant: Microvast New Materials (Huzhou) Co., Ltd., Huzhou, Zhejang Province (CN)

(72) Inventors: Lingyan Fu, Huzhou (CN); Hui Li, Huzhou (CN); Xiaoping Zhou, Huzhou (CN)

(73) Assignee: Microvast Power Systems Co., Ltd., Huzhou, Zhejiang Province (CN)

(*) Notice: Subject to any disclaimer, the term of this patent is extended or adjusted under 35 U.S.C. 154(b) by 178 days.

(21) Appl. No.: 13/662,528

(22) Filed: Oct. 28, 2012

(65) Prior Publication Data
US 2013/0108539 A1    May 2, 2013

(30) Foreign Application Priority Data

Oct. 28, 2011  (CN) .......................... 2011 1 0331939

(51) Int. Cl.
| | | |
|---|---|---|
| H01B 1/06 | (2006.01) | |
| H01M 4/133 | (2010.01) | |
| H01M 4/1393 | (2010.01) | |
| H01M 4/485 | (2010.01) | |
| H01M 4/587 | (2010.01) | |
| H01M 4/62 | (2006.01) | |

(52) U.S. Cl.
CPC .................. *H01M 4/133* (2013.01); *H01B 1/06* (2013.01); *H01M 4/1393* (2013.01); *H01M 4/485* (2013.01); *H01M 4/587* (2013.01); *H01M 4/62* (2013.01); *Y02E 60/122* (2013.01)

(58) Field of Classification Search
CPC . Y02E 60/122; Y02E 60/13; H01M 10/0525; H01M 10/052; H01M 4/661
USPC ........................................................ 252/506
See application file for complete search history.

(56) References Cited

U.S. PATENT DOCUMENTS

| 4,857,395 | A  | * | 8/1989 | Benton et al. ............. 428/306.6 |
| 6,451,482 | B1 | * | 9/2002 | Watanabe et al. .......... 429/231.1 |
| 2003/0096167 | A1 | * | 5/2003 | Park et al. ................... 429/231.8 |
| 2003/0129494 | A1 | * | 7/2003 | Kaneda et al. ............. 429/231.1 |
| 2011/0165460 | A1 | * | 7/2011 | Jito et al. ................... 429/218.1 |

FOREIGN PATENT DOCUMENTS

| CN | 1412871 A | 4/2003 |
| CN | 1547271 A | 11/2004 |

* cited by examiner

*Primary Examiner* — Mark Kopec
*Assistant Examiner* — William Young
(74) *Attorney, Agent, or Firm* — Cheng-Ju Chiang

(57) ABSTRACT

A method for preparing a negative electrode material of a lithium ion battery is provided. In the method, a solvent-thermal reaction of a graphite material and a modifier precursor in an organic solvent is conducted to form a reaction product. And then, the reaction product is dried. Next, a heat treatment is applied to the dried reaction product to obtain the negative electrode material. The negative electrode material prepared by the method has improved cycle stability and high current performance.

10 Claims, 3 Drawing Sheets

METHOD FOR PREPARING NEGATIVE ELECTRODE MATERIAL OF LITHIUM ION BATTERY

FIELD OF THE INVENTION

The present invention relates to a lithium ion battery, and particularly to a method for preparing a negative electrode material of a lithium ion battery.

BACKGROUND OF THE INVENTION

Lithium ion batteries are widely used in portable electronic products such as mobile phones, laptop computers and cameras. Moreover, now, the lithium-ion batteries are also used in hybrid power automobiles. The lithium-ion batteries with high energy are expected to be used for providing electrical power to the electric automobiles. Currently, graphitized carbon negative electrode materials are conventional materials used in the most commercialized lithium-ion batteries because the graphitized carbon negative electrode materials have advantages of low cost and easy control of synthesis processes. However, Carbon negative materials used in the lithium-ion batteries can react during a charging process to form lithium carbides. Due to the instability of the carbon negative materials in an aqueous electrolyte, a conventional lithium-ion battery including a carbon negative material generally employs an organic electrolyte such as a carbonate electrolyte. Thus, during a charging-discharging process, a portion of a reaction product of the organic electrolyte and the carbon negative material covering the surface of the carbon negative material can form a solid-electrolyte interface (SEI) or an interface protective layer (membrane). When the solid-electrolyte interface is relatively dense, the organic electrolyte and the carbon negative material can be effectively isolated, thereby avoiding the further reaction of the organic electrolyte and the carbon negative material. The generation of the solid-electrolyte interface is related to not only the carbon negative material but also the electrolyte (Electrochimica Acta 55 (2010) 6332-6341. In the charging-discharging process, in particular in the charging-discharging process with high output characteristics and at high current, the structure degradation of the carbon (graphite) negative material will occur and the carbon negative material will react with the electrolyte, thereby decreasing the discharge capacity and deteriorating of the cycle performance.

A surface treatment is an effective method to improve the performance of the graphite negative material. The surface treatment is generally to coat the graphite negative material with metal or metal oxide, which is disclosed detailedly by Yuping Wu in his book of *Lithium-ion battery—Application and Practic*. The surface-modification of the electrode material by the surface treatment plays a positive role. For example, (1) the ion-conductor can be formed on the electrode surface, which contributes to the surface charge transfer; (2) the electrode surface chemical properties can be improved, thereby enhancing the performance of the lithium-ion battery; (3) the surface-modified electrode material can be as the HF removing agent, so as to reduce the acidity of the non-aqueous electrolyte and inhibit the dissolution of metal ions in the positive electrode material; (4) the surface-modified electrode material can has a physical protection layer to prevent a side reaction of the electrode material and the non-aqueous electrolyte. Chinese Patent No. CN 02125138.X discloses a method for preparing a negative active material for a lithium rechargeable battery. The method includes the steps of coating a carbon source with a coating liquid and drying the carbon source, and so on. The coating liquid includes a solute of a coating element source and a solvent of a mixture of an organic solvent and water. Chinese Patent No. CN 200310107365.6 discloses a method for surface-modifying a graphite negative material of a lithium-ion secondary battery by forming oxide film. In the method, graphite powders are immersed into a saturated lithium hydroxide solution containing ethanol to obtain a mixture, and then the mixture is filtered and dried at room temperature under $CO_2$ atmosphere. In the above surface treatment methods, a solid electrolyte interface layer is usually formed on the surface of the graphite negative material. However, the solid electrolyte interface layer can not improve the interlayer structure of the graphite negative material to increase the migration rate of the lithium ions between the graphite layers.

SUMMARY OF THE INVENTION

The present invention is directed to a method for preparing a negative electrode material of a lithium ion battery. The negative electrode material prepared by the method has improved cycle stability and high current charge-discharge performance (also known as the high rate charge-discharge performance).

The present invention provides a method for preparing a negative electrode material of a lithium ion battery. In the method, a solvothermal reaction of a graphite material and a modifier precursor in an organic solvent is conducted to form a reaction product. And then, the reaction product is dried. Next, a heat treatment is applied to the dried reaction product to obtain the negative electrode material.

In one embodiment of method of the present invention, the graphite material includes at least one selected from a group consisting of graphitized meso-carbon microbead (MCMB), natural graphite and artificial graphite.

In one embodiment of method of the present invention, the modifier includes at least one selected from a group consisting of aluminum oxide, titanium oxide, cobalt oxide, nickel oxide, silicon oxide, boron oxide, zirconium oxide and vanadium oxide.

In one embodiment of method of the present invention, the modifier precursor includes at least one of an alkoxide and an oxyhydroxide. The alkoxide is at least one selected from a group consisting of aluminum alkoxide, titanium alkoxide, cobalt alkoxide, nickel alkoxide, silicon alkoxide, boron alkoxide, zirconium alkoxide and vanadium alkoxide. The oxyhydroxide is at least one selected from a group consisting of aluminum oxyhydroxide, titanium oxyhydroxide, cobalt oxyhydroxide, nickel oxyhydroxide, silicon oxyhydroxide, boron oxyhydroxide, zirconium oxyhydroxide and vanadium oxyhydroxide.

In one embodiment of method of the present invention, the organic solvent comprises at least one selected from a group consisting of alcohols, alkanes, cycloalkanes, carbonates, benzene and benzene derivatives. In another embodiment of method of the present invention, the organic solvent comprises at least one selected from a group consisting of N,N-dimethylformamide (DMF), N,N-dimethylacetamide (DMAC), dimethyl sulfoxide (DMSO) and N-methyl-2-pyrrolidone (NMP).

In one embodiment of method of the present invention, the organic solvent comprises at least one selected from a group consisting of anhydrous ethanol, isopropanol and N-methyl-2-pyrrolidone (NMP).

In one embodiment of method of the present invention, a reaction temperature of the solvothermal reaction is in a range from 100° C. to 250° C. Preferably, the reaction temperature of the solvothermal reaction is in a range from 140° C. to 200° C.. A reaction time of the solvothermal reaction is in a range from 1 hour to 24 hours.

In one embodiment of method of the present invention, a drying temperature of the reaction product is in a range of 80° C. to 200° C. and a treatment temperature of the heat treatment is in a range from 250° C. to 900° C.

In one embodiment of method of the present invention, in the negative electrode material, a weight ratio of the modifier to the negative electrode material is in a range from 0.05% to 20%. Preferably, a weight ratio of the modifier to the negative electrode material is in a range from 0.5% to 5%.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
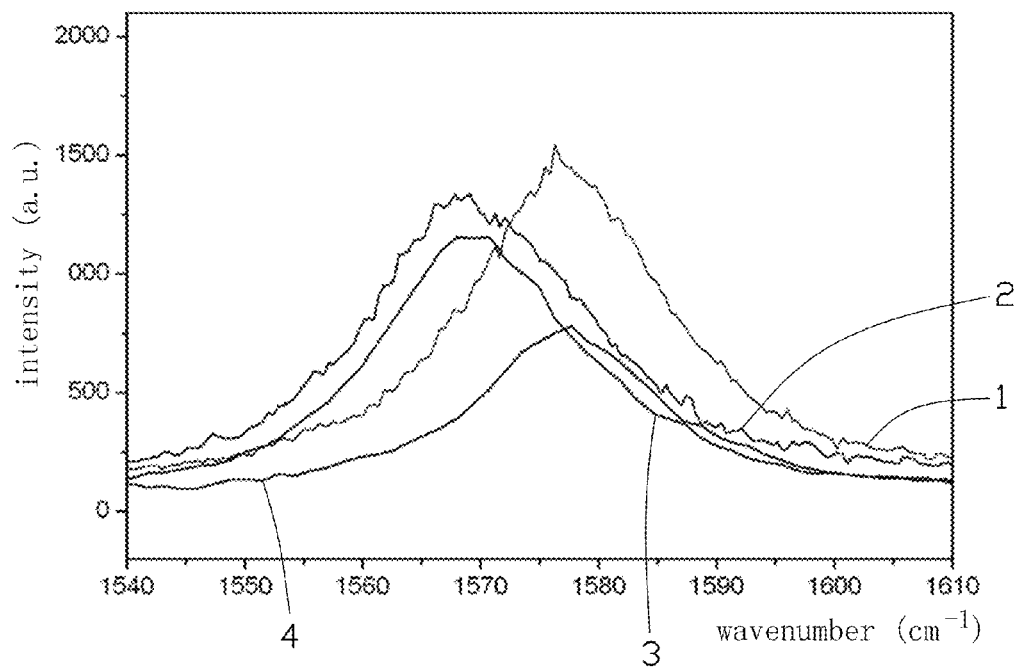
FIG. 1 illustrates a confocal micro-Raman spectrogram of the flake graphite material and the flake graphite material modified by $TiO_2$ in accordance with the method of the present invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

A method for preparing a negative electrode material of a lithium ion battery includes the following steps. In the method, at first, a solvothermal reaction of a graphite material and a modifier precursor in an organic solvent is conducted to form a reaction product. And then, the reaction product is dried. Next, a heat treatment is applied to the dried reaction product to obtain the negative electrode material comprising the graphite material and a modifier formed by the modifier precursor.

The graphite material refers to a graphitized carbon material capable of intercalating and de-intercalating a lithium ion ($Li^+$), which includes natural graphite and artificial graphite.

In a preferred embodiment, the graphite material includes at least one of graphitized meso-carbon microbead (MCMB), flake or spherical natural graphite and artificial graphite. Preferably, the graphite material includes graphitized meso-carbon microbead (MCMB).

The modifier precursor can form a modifier that comprises at least one of aluminum oxide, titanium oxide, cobalt oxide, nickel oxide, silicon oxide, boron oxide, zirconium oxide and vanadium oxide.

In addition, the modifier precursor can comprise at least one of aluminum compound, titanium compound, cobalt compound, nickel compound, silicon compound, boron compound, zirconium compound and vanadium compound. In a preferred embodiment, the modifier precursor can comprise at least one of an alkoxide and an oxyhydroxide. The alkoxide is at least one of aluminum alkoxide, titanium alkoxide, cobalt alkoxide, nickel alkoxide, silicon alkoxide, boron alkoxide, zirconium alkoxide and vanadium alkoxide. The oxyhydroxide is at least one of aluminum oxyhydroxide, titanium oxyhydroxide, cobalt oxyhydroxide, nickel oxyhydroxide, silicon oxyhydroxide, boron oxyhydroxide, zirconium oxyhydroxide and vanadium oxyhydroxide.

The organic solvent refers to a liquid organic solvent capable of dissolving the modifier precursor. The organic solvent can include at least one of alcohols, alkanes, cycloalkanes, carbonates, benzene and benzene derivatives. In detail, the organic solvent can include at least one of anhydrous ethanol, isopropanol, N,N-dimethylformamide (DMF), N,N-dimethylacetamide (DMAC), dimethyl sulfoxide (DMSO) and N-methyl-2-pyrrolidone (NMP). In a preferred embodiment, the organic solvent includes at least one of anhydrous ethanol, isopropanol and N-methyl-2-pyrrolidone (NMP).

In the method of the present invention, the graphite material is mixed into the organic solvent containing the modifier precursor to form a mixture. And then, the mixture is put into a sealing system to be heated to a constant reaction temperature to conduct the solvothermal reaction of the graphite material and the modifier precursor. The reaction temperature of the solvothermal reaction is, for example, in a range from 100° C. to 250° C.. Preferably, the reaction temperature of the solvothermal reaction is in a range from 140° C. to 200° C. A reaction time of the solvothermal reaction is, for example, in a range from 0.5 to 100 hours. Preferably, the reaction time of the solvothermal reaction is, for example, in a range from 1 to 24 hours.

After the solvothermal reaction, a reaction product can be formed. Then, the reaction product can be dried at a temperature in a range from 80° C. to 200° C.. Thereafter, the heat treatment is applied to the dried reaction product to obtain the negative electrode material comprising the graphite material and a modifier formed by the modifier precursor. A heat treatment temperature is, for example, at a temperature in a range from 250° C. to 900° C.

In one embodiment of method of the present invention, in the obtained negative electrode material, a weight ratio of the modifier to the negative electrode material is in a range from 0.05% to 20%. Preferably, a weight ratio of the modifier to the negative electrode material is in a range from 0.5% to 5%.

For the carbon negative material having a certain structure and organization, the defects, such as holes, pores and dislocation, inside the carbon negative material are electrolyte reaction active positions, which are important reasons for affecting the compatibility of the carbon negative material and the electrolyte. Particularly, the electrolyte is more prone to being decomposed at the edge surface of the carbon negative material. When the graphite material is modified, an interface layer can be formed at the defects and on the edge surface, a graft can be formed at hydroxyl reactive groups, and the interface properties can be improved. Thus, the surface-modification of the graphite material has an important impact on the formation, the structure and the stability of the solid-electrolyte interface (SEI). Meanwhile, some metal atoms can enter into the graphite layers, thereby providing more convenient migrating channels for the lithium ions. In addition, the graphite material modified by the oxide has been changed from a non-polar material to a polar material. Thus, a lithium salt solute in the electrolyte (for example, $LiPF_6$, etc.) can be easily adsorbed on the surface of the polar negative electrode material, thereby improving the high current discharge performance and the cycle stability.

The solvothermal reaction is developed from a conventional hydrothermal reaction. The solvothermal reaction is similar to the conventional hydrothermal reaction except that a solvent is not water but the organic solvent. In the conventional hydrothermal reaction, the particles in the interlayer of the graphite material are extracted, or only a solid oxide film is formed on the surface of the graphite material. In the method of the present invention, the metal ions such as titanium ions can enter into the interlayer of the graphite material by the solvothermal reaction. The intercalation of the metal ions such as the titanium ions can increase an interlamellar spacing of the graphite material along a z-axis direction, thereby reducing the transfer resistance of the lithium ions, accelerating the migration rate of the lithium ions in the graphite layer, and reducing the exchange current density of the lithium ions. Because the rapid immigration and outmigration of the lithium ions between the layers of the graphite material, a concentration polarization will not occur at the interface. Thus, the metal lithium will not be deposited on the outer surface of the graphite material in a discharging condition of high output power and high current, thereby avoiding generating an undesirable dendrite. The dendrite can react with the electrolyte to form aldehydes, in fact, methanoic acid, and after a second-stage reaction, methanol can be generated, and finally an alcohol lithium compound can be formed. During the charging process, an oxidation reaction of the alcohol lithium compound at the positive electrode makes the alcohol lithium compound lose electrons to form formaldehyde. The formaldehyde is further oxidized to form products, including CO2, CO, H2O, which is harmful to the battery. Therefore, the charging-discharging performance and the cycle stability of the graphite negative electrode material modified by the solvothermal reaction can be greatly improved.

The following examples can prove the improvement of the charging-discharging performance and the cycle stability of the graphite negative electrode material modified by the solvothermal reaction.

EXAMPLE 1

At first, 10 g flake graphite are put into a 100 mL reaction vessel, and then 80 ml different organic solvents (e.g., isopropanol, ethanol, or N-methyl-2-pyrrolidone(NMP)) and a certain amount of a modifier precursor such as isopropyl titanate are added into the reaction vessel. The amount of the modifier precursor is determined by the weight ratio of the modifier ($MO_X$) to the product (the negative electrode material). In the present embodiment, for example, a weight ratio of the modifier to the negative electrode material is 4%. Next, the reaction vessel is sealed. The reaction vessel is displaced in an oven at 150° C. for about 3 hours. That is, a reaction vessel reaction temperature of the reaction vessel is disposed at 150° C., and a reaction time is 3 hours. Thereafter, a supernatant in the reaction vessel is decanted to obtain the reaction product. The reaction product is dried at 105° C., then is heated in a tubular furnace in a $N_2$ atmosphere at 300° C. for 3 hours to obtain a modified graphite material. The modified graphite material and a flake graphite material were characterized by a laser Raman spectrometry by using a confocal micro-Raman spectroscopy (Jobin Yvon, France). The laser is, for example, an $Ar^+$ laser. FIG. 1 illustrates confocal micro-Raman spectrograms of the flake graphite material and the modified graphite materials in accordance with the method of the present invention. Numeral 1 represents a confocal micro-Raman spectrogram of the flake graphite material, numeral 2 represents a confocal micro-Raman spectrogram of the modified graphite material by using the modifier precursor of $Ti(OC_3H_7)_4$ and the organic solvent of $C_2H_5OH$, numeral 3 represents a confocal micro-Raman spectrogram of the modified graphite material by using the modifier precursor of $Ti(OC_3H_7)_4$ and the organic solvent of $C_3H_7OH$, and numeral 4 represents a confocal micro-Raman spectrogram of the modified graphite material by using the modifier precursor of $Ti(OC_3H_7)_4$ and the organic solvent of NMP. As shown in FIG. 1, the positions of the Raman spectrum peaks are greatly affected by the modifier precursor and the organic solvent and red shifts (decrease in wavenumber) of the $E_{2g}$ characteristic peaks located at 1576 $cm^{-1}$ occur. The distribution of the carbon charge is changed due to the doped hetero atoms, thereby causing the red shifts of the $E_{2g}$ characteristic peaks. In other words, Ti has been intercalated into the graphite interlayer. To form the graphite modified by $TiO_2$, the organic solvent such as isopropanol, ethanol, or N-methyl-2-pyrrolidone(NMP) is preferred.

EXAMPLE 2

Figure 2:
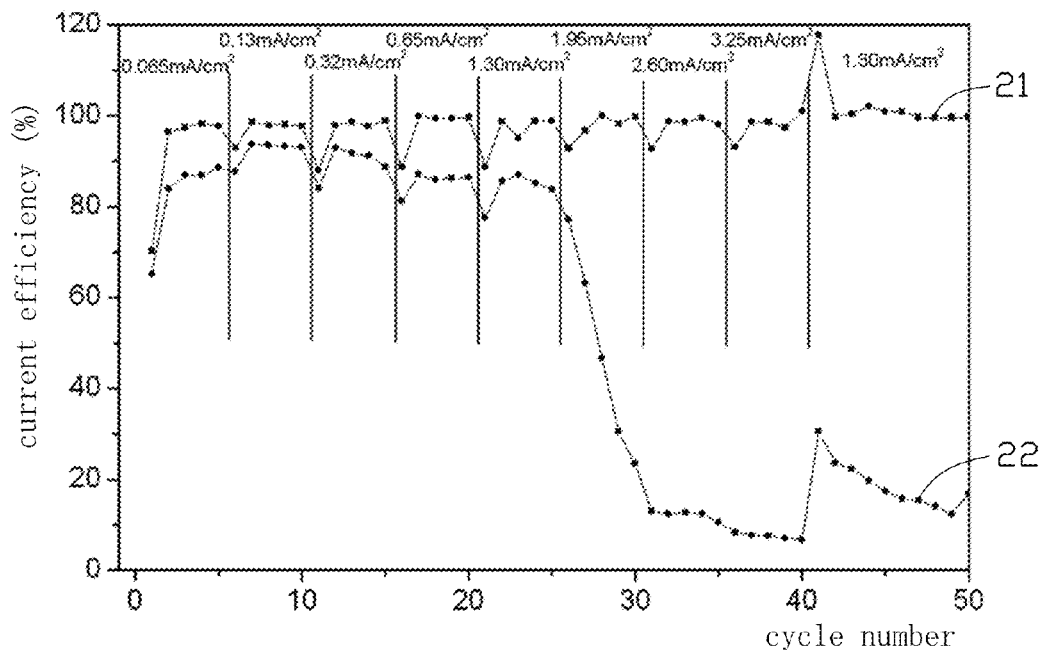
FIG. 2 illustrates rate cycle performance of CR2025 coin cell containing the flake graphite material and the flake graphite material modified by $TiO_2$ in accordance with the method of the present invention at different current densities.

A lithium-ion battery is manufactured by the following steps. At first, an electrode material slurry is prepared. A weight proportion of polyvinylidene difluoride (PVDF), carbon black and negative electrode material is equal to 10:8:82. Then, the electrode material slurry is coated on a copper foil having a thickness of 9 μm. After the copper foil coated with the negative electrode material is dried in a vacuum condition, the copper foil coated with the negative electrode material is cut into and assembled, thereby forming a CR2025 lithium-ion battery. That is, a positive electrode material is ternary lithium nickel cobalt manganese oxide, and the negative electrode material is, for example, the flake graphite material or the flake graphite material modified by $TiO_2$. In addition, a separator is, for example, a Celgard 2400 signal layer separator, and an electrolyte is, for example, a LB4381 electrolyte (Zhangjiagang Guotai-Huarong New Chemical Materials Co., Ltd). To test the effect of the modification, the excess positive electrode material is used, and the battery is tested in a manner of charging in limited time and discharging in limited voltage. The battery is tested by a charge-discharge cycle process at different current densities orderly (e.g., 0.065 mA/$cm^2$ (10 hours), 0.13 mA/$cm^2$ (5 hours), 0.32 mA/$cm^2$ (2 hours), 0.65 mA/$cm^2$ (1 hours), 1.30 mA/$cm^2$ (0.5 hour), 1.95 mA/$cm^2$ (20 minutes), 2.60 mA/$cm^2$ (15 minutes), 3.25 mA/$cm^2$ (12 minutes) and charge-discharge cycle number is 5, and finally at 1.30 mA/$cm^2$ (30 minutes) and a charge-discharge cycle number is 10. A discharge cut-off voltage is 2.8 V. FIG. 2 illustrates current efficiency curves of the flake graphite material and the flake graphite material modified by $TiO_2$ at different current densities. Numeral 21 represents a current efficiency curve of the modified flake graphite material, and numeral 22 represents a current efficiency curve of the flake graphite material. As shown in FIG. 2, at the high current density charge-discharge condition, the flake graphite material modified by $TiO_2$ exhibit more excellent cycle stability than the flake graphite material.

EXAMPLE 3

Figure 3:
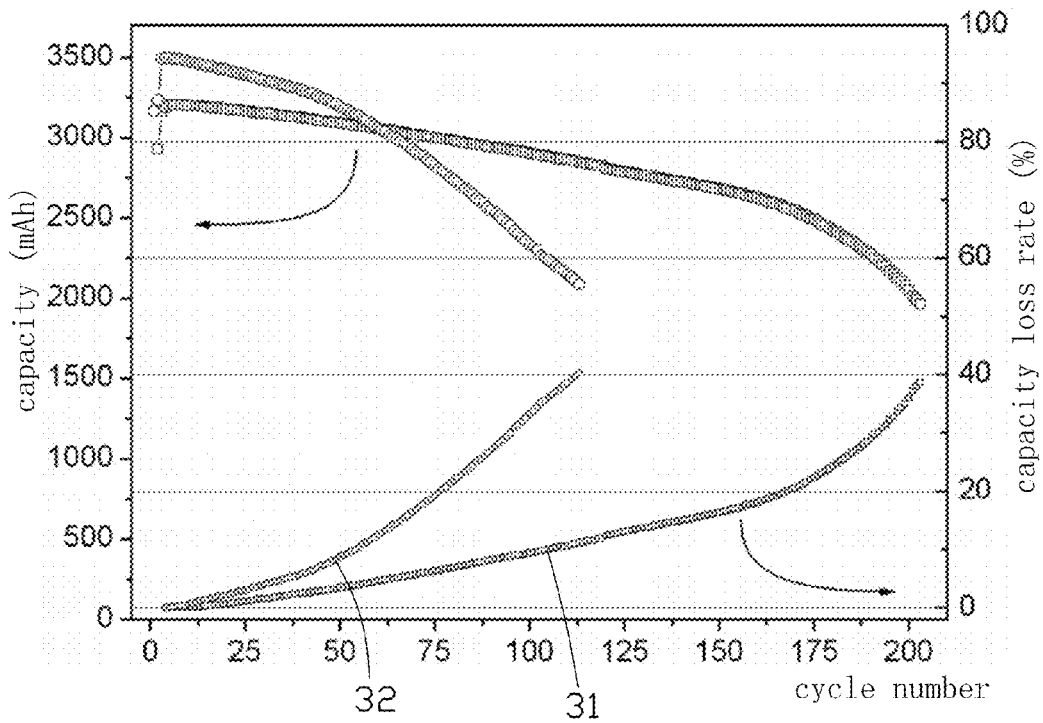
FIG. 3 illustrates a 5 C charge-discharge curve graph of the 28650 lithium ion batteries using the flake graphite material modified by $TiO_2$ in accordance with the method of the present invention and the flake graphite material.

2.0 kg flake graphite are put into an FCF10-5.0 automatic control reaction vessel, and then 336 g isopropyl titanate and a certain amount of isopropanol are added into the reaction vessel. The mixture reacts in the reaction vessel at 180° C. for about 3 hours. Thereafter, a supernatant in the reaction vessel is decanted to obtain the reaction product. The reaction product is dried at 120° C., then is heated in a blast furnace in a $N_2$ atmosphere at 400° C. for 3 hours to obtain a modified graphite material. A 26650 lithium-ion battery ($LiFePO_4$ Battery) is manufactured to be tested. That is, a positive electrode material is lithium iron phosphate, and the negative electrode material is, for example, the flake graphite material or the flake graphite material modified by $TiO_2$. FIG. 3 illustrates a charge-discharge curve graph of the lithium ion batteries using the flake graphite material modified by $TiO_2$ and the flake graphite material. Numeral 31 represents a charge-discharge curve of the lithium ion battery using the modified flake graphite material, and numeral 32 represents a charge-discharge curve of the lithium ion battery using the flake graphite material. As shown in FIG. 3, after 77 charge-discharge cycles, a capacity of the lithium-ion battery having the flake graphite material has 20% attenuation, and after 168 charge-discharge cycles, a capacity of the lithium-ion battery having the flake graphite material modified by $TiO_2$ has 20% attenuation. That is, a charge-discharge cycle life if the flake graphite material modified by $TiO_2$ has an increase of 1.18 times, and the cycle stability at high current density has been significantly improved.

EXAMPLE 4

Figure 4:
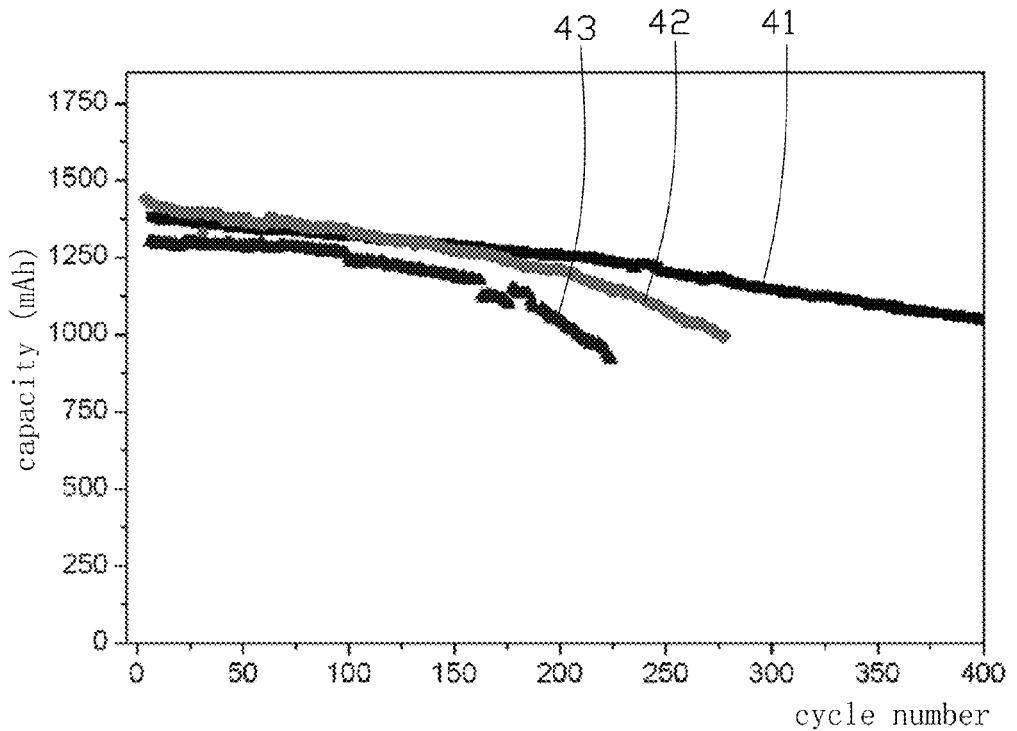
FIG. 4 illustrates a charge-discharge curve graph of the 18650 lithium ion batteries using the spherical graphite material modified by $TiO_2$, the spherical graphite material modified by $ZrO_2$ in accordance with the method of the present invention and the spherical graphite material. (test condition: 3 C charge/15 C discharge, voltage range 3.0~4.2V, cut off current of constant voltage charge 130 mA (0.1 C)).

At first, 2.7 kg spherical graphite are put into an FCF10-5.0 automatic control reaction vessel, and then 1.80 kg isopropanol and 450 g isopropyl titanate with a purity of 98% are added into the reaction vessel. The mixture reacts at 150° C. for about 3 hours. After the reaction vessel is cooled down to the room temperature, a supernatant in the reaction vessel is decanted to obtain the reaction product. The reaction product is heated in a $N_2$ atmosphere at 300° C. for 3 hours to obtain a modified spherical graphite material. A 18650 lithium-ion battery is manufactured to be tested. That is, a positive electrode material is ternary lithium nickel cobalt manganese oxide, and the negative electrode material is, for example, the spherical graphite material or the spherical graphite material modified by $TiO_2$. FIG. 4 illustrates a charge-discharge curve graph of the lithium ion batteries using the spherical graphite material modified by $TiO_2$ and the spherical graphite material. Numeral 41 represents a charge-discharge curve of the lithium ion battery using the spherical graphite material modified $TiO_2$, and numeral 43 represents a charge-discharge curve of the lithium ion battery using the spherical graphite material. The batteries are charged at 3C charge rate and are discharged at 15C discharge rate, a charge-discharge voltage range is 3.0~4.20V, a constant current charging cut-off current is 130 mA (0.1C). After the charge-discharge process, the batteries are set aside for about 5 minutes. As shown in FIG. 4, after 224 charge-discharge cycles, a capacity of the lithium-ion battery having the spherical graphite material has 30% attenuation, and after 401 charge-discharge cycles, a capacity of the lithium-ion battery having the spherical graphite material modified by $TiO_2$ has 30% attenuation. That is, the charge-discharge cycle life of the spherical graphite material modified by $TiO_2$ has an increase of 79%. The spherical graphite material modified by $TiO_2$ has better charge-discharge cycle performance than the spherical graphite material.

EXAMPLE 5

2.00 kg spherical graphite are put into an FCF10-5.0 automatic control reaction vessel, and then 1.40 kg isopropanol and 260 g zirconium propylate with a purity of 70% are added into the reaction vessel. The mixture reacts at 170° C. for about 3hours. After the reaction vessel is cooled down to the room temperature, a supernatant in the reaction vessel is decanted to obtain the reaction slurry. The reaction product is heated in a $N_2$ atmosphere at 500° C. for 3 hours to obtain a modified spherical graphite material. A 18650 lithium-ion battery is manufactured to be tested. That is, a positive electrode material is ternary lithium nickel cobalt manganese oxide, and the negative electrode material is, for example, the spherical graphite material or the spherical graphite material modified by $ZrO_2$. FIG. 4 illustrates a charge-discharge curve graph of the lithium ion batteries using the spherical graphite material modified by $ZrO_2$ and the spherical graphite material. Numeral 42 represents a charge-discharge curve of the lithium ion battery using the spherical graphite material modified by $ZrO_2$, and numeral 43 represents a charge-discharge curve of the lithium ion battery using the spherical graphite material. As shown in FIG. 4, after 278 charge-discharge cycles, a capacity of the lithium-ion battery having the spherical graphite material modified by $ZrO_2$ has 30% attenuation. That is, the charge-discharge cycle life if the spherical graphite material modified by $ZrO_2$ has an increase of 24.1%.

EXAMPLE 6

2099.5 g flake graphite powder having a particle size of 5~10 μm, 429.6 g $Ti(OR)_4$ with a purity of 97%, 408.2 g $C_8H_{20}SiO_4$ and 3888.0 g isopropanol are mixed uniformly to form a mixture and are put into a 10 L autoclave. The mixture reacts in the autoclave at 160° C. for about 5 hours. Thereafter, a precipitate in the autoclave is vacuum dried at 120° C. for about 5 hours. The dried precipitate is then sintered in a $N_2$ atmosphere at 500° C. for 5 hours to obtain a modified graphite material. The modified flake graphite material can be directly used as a negative electrode material of a lithium-ion secondary battery.

Figure 5:
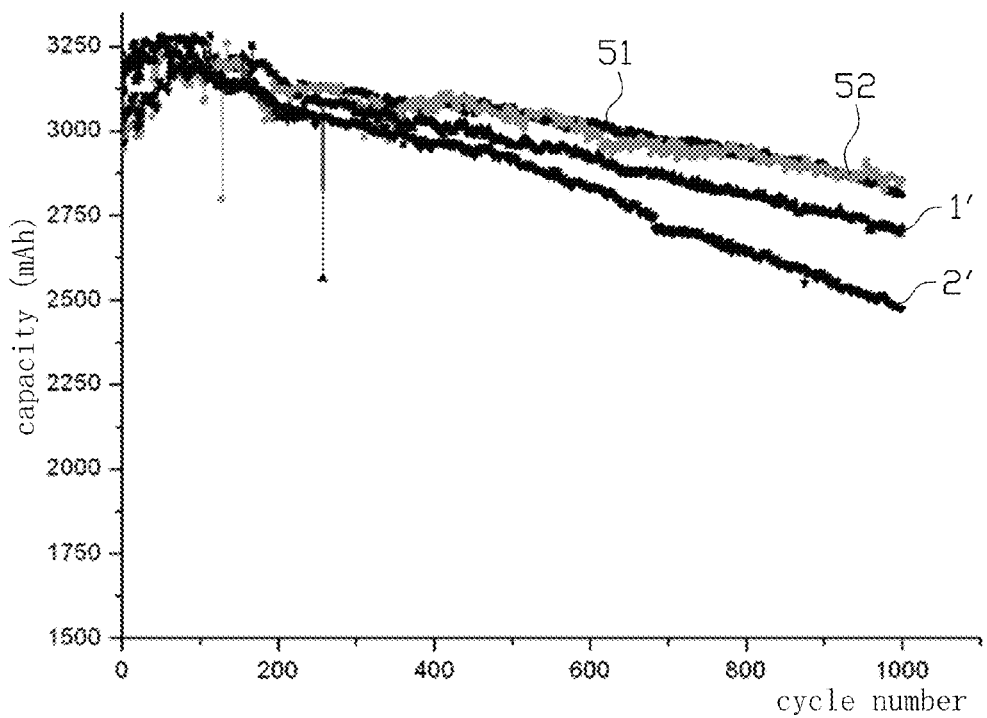
FIG. 5 illustrates a charge-discharge curve graph of the 26650E lithium ion batteries using the flake graphite material modified by $TiO_2$ in accordance with the method of the present invention and the flake graphite material.

1.9 Kg of the modified flake graphite material, a certain amount of a thickening agent, an adhesive and a conductive agent are mixed to form a mixing slurry. Then, a series of steps including coating the mixing slurry, compressing, cutting pieces, making electrodes, assembling, filling the electrolyte are performed, thereby forming a 26650E lithium ion batteries. As a comparison, 1.9 Kg of the unmodified flake graphite material is also used to forming 26650E lithium ion batteries. FIG. 5 illustrates a charge-discharge curve graph of the 26650E lithium ion batteries using the flake graphite material modified by $TiO_2$ in accordance with the method of the present invention and the flake graphite material. The batteries are charged and discharged at 9000 mA. Numeral 51 and numeral 52 respectively represent a charge-discharge curve of the lithium ion battery using the flake graphite material modified by $TiO_2$; and numeral 1' and numeral 2' respectively represent a charge-discharge curve of the lithium ion battery using the flake graphite material.

EXAMPLE 7

2099.5 g spherical graphite powder having a particle size of 5~10 μm, 429.6 g Ti(OR)$_4$ with a purity of 97%, 408.2 g $C_8H_{20}SiO_4$ and 3888.0 g isopropanol are mixed uniformly to form a mixture and are put into a 10 L autoclave. The mixture react in the autoclave at 160° C. for about 5 hours. Thereafter, a lower precipitate in the autoclave is vacuum dried at 120° C. for about 5 hours. The dried lower precipitate is then sintered in a N$_2$ protecting atmosphere at 500° C. for 5 hours to obtain a modified spherical graphite material. The modified spherical graphite material can be directly used as a negative electrode material of a lithium-ion secondary battery.

Figure 6:
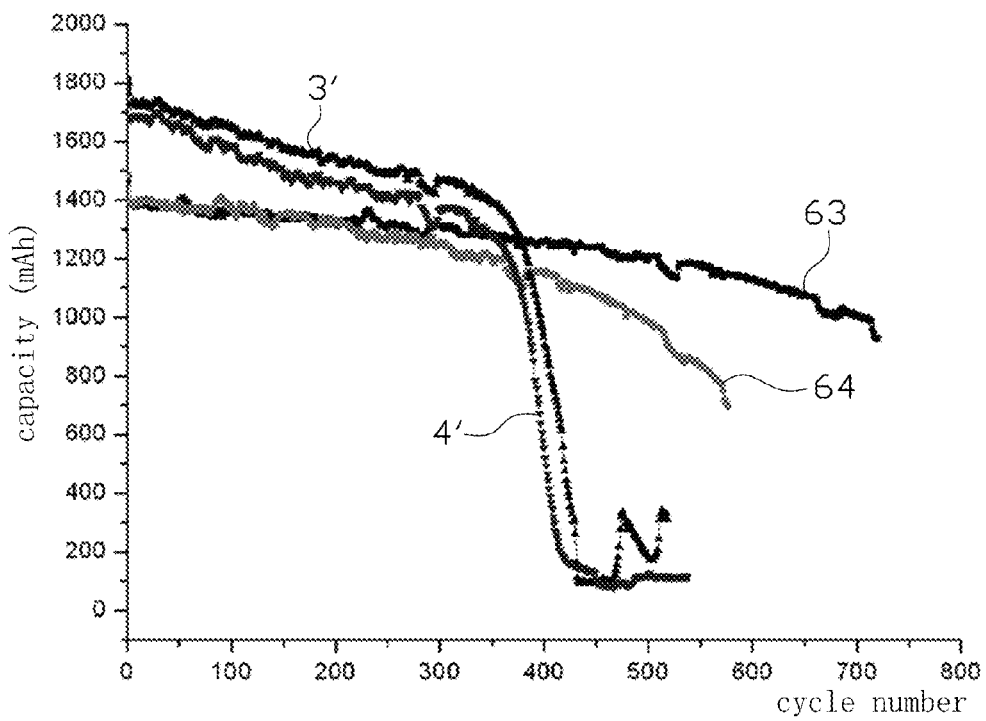
FIG. 6 illustrates a charge-discharge curve graph of the 18650P lithium ion batteries using the spherical graphite material modified by $TiO_2$ in accordance with the method of the present invention and the spherical graphite material.

1.9 Kg of the modified spherical graphite material, a certain amount of a thickening agent, an adhesive and a conductive agent are mixed to form a mixing slurry. Then, a series of steps including coating the mixing slurry, compressing, cutting pieces, making electrodes, assembling, filling the electrolyte are performed, thereby forming a 18650P lithium ion batteries. As a comparison, 1.9 Kg of the unmodified spherical graphite material is also used to forming 18650P lithium ion batteries. FIG. 6 illustrates a charge-discharge curve graph of the lithium ion batteries using the spherical graphite material modified by TiO2 in accordance with the method of the present invention and the spherical graphite material. The batteries are charged at 6.5 A and discharged at 19.5 A. Numeral 63 and numeral 64 respectively represent a charge-discharge curve of the lithium ion battery using the spherical graphite material modified by TiO2; and numeral 3' and numeral 4' respectively represent a charge-discharge curve of the lithium ion battery using the spherical graphite material.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for preparing a negative electrode material of a lithium ion battery, comprising:
    conducting a solvothermal reaction of a graphite material and a modifier precursor in an organic solvent to form a reaction product, wherein the graphite material, the organic solvent and the modifier precursor are mixed and put into a sealing system to be heated to a constant reaction temperature to conduct the solvothermal reaction, wherein a reaction temperature of the solvothermal reaction is in a range from 140° C. to 200° C.;
    drying the reaction product; and
    applying a heat treatment to the dried reaction product to obtain a negative electrode material comprising a modifier.

2. The method of claim 1, wherein the graphite material comprises at least one selected from a group consisting of graphitized meso-carbon microbead (MCMB), natural graphite and artificial graphite.

3. The method of claim 1, wherein the modifier comprises at least one selected from a group consisting of aluminum oxide, titanium oxide, cobalt oxide, nickel oxide, silicon oxide, boron oxide, zirconium oxide and vanadium oxide.

4. The method of claim 1, wherein the modifier precursor comprises at least one of an alkoxide and an oxyhydroxide, the alkoxide is at least one selected from a group consisting of aluminum alkoxide, titanium alkoxide, cobalt alkoxide, nickel alkoxide, silicon alkoxide, boron alkoxide, zirconium alkoxide and vanadium alkoxide, and the oxyhydroxide is at least one selected from a group consisting of aluminum oxyhydroxide, titanium oxyhydroxide, cobalt oxyhydroxide, nickel oxyhydroxide, silicon oxyhydroxide, boron oxyhydroxide, zirconium oxyhydroxide and vanadium oxyhydroxide.

5. The method of claim 1, wherein the organic solvent comprises at least one selected from a group consisting of alcohols, alkanes, cycloalkanes, carbonates, benzene and benzene derivatives.

6. The method of claim 1, wherein the organic solvent comprises at least one selected from a group consisting of anhydrous ethanol, isopropanol and N-methyl-2-pyrrolidone (NMP).

7. The method of claim 1, wherein a reaction time of the solvothermal reaction is in a range from 1 hour to 24 hours.

8. The method of claim 1, wherein a treatment temperature of the heat treatment is in a range from 250° C. to 900° C.

9. The method of claim 1, wherein a weight ratio of the modifier to the negative electrode material is in a range from 0.05% to 20%.

10. The method of claim 1, wherein a weight ratio of the modifier to the negative electrode material is in a range from 0.5% to 5%.

* * * * *